(12) United States Patent
Gilbert et al.

(10) Patent No.: US 7,134,639 B2
(45) Date of Patent: Nov. 14, 2006

(54) LATCHING MICRO-REGULATOR

(75) Inventors: John R. Gilbert, Brookline, MA (US); Bernard Bunner, Watertown, MA (US); Sebastian Böhm, Inverness (GB); Manish Deshpande, Canton, MA (US)

(73) Assignee: Cytonome, Inc., Watertown, MA (US)

( * ) Notice: Subject to any disclaimer, the term of this patent is extended or adjusted under 35 U.S.C. 154(b) by 0 days.

(21) Appl. No.: 11/099,014

(22) Filed: Apr. 4, 2005

(65) Prior Publication Data

US 2005/0166975 A1 Aug. 4, 2005

Related U.S. Application Data

(62) Division of application No. 10/179,537, filed on Jun. 24, 2002, now Pat. No. 6,981,518.

(60) Provisional application No. 60/364,803, filed on Mar. 15, 2002.

(51) Int. Cl.
*F16K 31/02* (2006.01)
(52) U.S. Cl. .................. 251/129.06; 251/65
(58) Field of Classification Search .......... 251/129.06, 251/129.2, 65, 129.01
See application file for complete search history.

(56) References Cited

U.S. PATENT DOCUMENTS

| | | | | |
|---|---|---|---|---|
| 4,561,632 A | * | 12/1985 | Hugler | .................. 251/129.15 |
| 5,238,223 A | * | 8/1993 | Mettner et al. | ........ 251/129.06 |
| 5,259,415 A | * | 11/1993 | Hess et al. | ..................... 251/65 |
| 5,343,894 A | * | 9/1994 | Frisch et al. | ........... 251/129.06 |
| 5,381,817 A | * | 1/1995 | Gassman et al. | ...... 251/129.06 |
| 5,826,619 A | * | 10/1998 | Roman | ................... 137/624.11 |
| 6,328,279 B1 | * | 12/2001 | Adkins et al. | ......... 251/129.07 |
| 6,499,509 B1 | * | 12/2002 | Berger et al. | .......... 251/129.06 |
| 6,592,098 B1 | * | 7/2003 | Kao et al. | .............. 251/129.01 |

* cited by examiner

*Primary Examiner*—Stephen M. Hepperle
(74) *Attorney, Agent, or Firm*—Lahive & Cockfield, LLP

(57) ABSTRACT

A latching microregulator for regulating liquid flow on micro-scale levels comprises a substrate having an inlet port and an outlet port, a valve element defining a valve chamber for opening and closing the inlet port, and an actuator assembly for actuating the valve element. The valve chamber is configured to contain a volume of fluid, and the inlet port and the outlet port are in fluid communication with the valve chamber to provide a liquid flow path through the chamber. The actuator assembly comprises a cantilever beam for moving the valve element between an open position and a closed position, an actuator, such as a piezoelectric element, for moving the cantilever beam, and a latch, such as a permanent magnet, for securing the cantilever beam in the closed position. A flow regulation system comprises a plurality of fluid channels of varied flow conductance and a plurality of latching microregulators for selectively blocking or allowing flow through each of the fluid channels.

18 Claims, 4 Drawing Sheets

LATCHING MICRO-REGULATOR

RELATED APPLICATION

The present invention is a divisional application of U.S. patent application Ser. No. 10/179,537 filed Jun. 24, 2002 now U.S. Pat. No. 6,981,518 entitled "Latching Micro-Regulator" which, in turn, claims priority to U.S. Provisional Patent Application No. 60/364,803 filed Mar. 15, 2002 entitled "Latching Micro-Regulator", the contents of which are herein incorporated by reference.

FIELD OF THE INVENTION

The present invention relates to a micro-regulator and a bi-stable latching valve for regulating fluid flow on micro-scale dimensions.

BACKGROUND OF THE INVENTION

In the chemical, biomedical, bioscience and pharmaceutical industries, it has become increasingly desirable to perform large numbers of chemical operations, such as reactions, separations and subsequent detection steps, in a highly parallel fashion. The high throughput synthesis, screening and analysis of (bio)chemical compounds, enables the economic discovery of new drugs and drug candidates, and the implementation of sophisticated medical diagnostic equipment. Of key importance for the improvement of the chemical operations required in these applications are an increased speed, enhanced reproducibility, decreased consumption of expensive samples and reagents, and the reduction of waste materials.

Microfluidic devices and systems provide improved methods of performing chemical, biochemical and biological analysis and synthesis. Microfluidic devices and systems allow for the performance of multi-step, multi-species chemical operations in chip-based micro chemical analysis systems. Chip-based microfluidic systems generally comprise conventional 'microfluidic' elements, particularly capable of handling and analyzing chemical and biological specimens. Typically, the term microfluidic in the art refers to systems or devices having a network of processing nodes, chambers and reservoirs connected by channels, in which the channels have typical cross-sectional dimensions in the range between about 1.0 µm and about 500 µm. In the art, channels having these cross-sectional dimensions are referred to as 'microchannels'.

By performing the chemical operations in a microfluidic system, potentially a number of the above-mentioned desirable improvements can be realized. Downscaling dimensions allows for diffusional processes, such as heating, cooling and passive transport of species (diffusional mass-transport), to proceed faster. One example is the thermal processing of liquids, which is typically a required step in chemical synthesis and analysis. In comparison with the heating and cooling of liquids in beakers as performed in a conventional laboratory setting, the thermal processing of liquids is accelerated in a microchannel due to reduced diffusional distances. Another example of the efficiency of microfluidic systems is the mixing of dissolved species in a liquid, a process that is also diffusion limited. Downscaling the typical dimensions of the mixing chamber thereby reduces the typical distance to be overcome by diffusional mass-transport, and consequently results in a reduction of mixing times. Like thermal processing, the mixing of dissolved chemical species, such as reagents, with a sample or precursors for a synthesis step, is an operation that is required in virtually all chemical synthesis and analysis processes. Therefore, the ability to reduce the time involved in mixing provides significant advantages to most chemical synthesis and analysis processes.

Another aspect of the reduction of dimensions is the reduction of required volumes of sample, reagents, precursors and other often very expensive chemical substances. Milliliter-sized systems typically require milliliter volumes of these substances, while microliter sized microfluidic systems only require microliter volumes. The ability to perform these processes using smaller volumes results in significant cost savings, allowing the economic operation of chemical synthesis and analysis operations. As a consequence of the reduced volume requirement, the amount of chemical waste produced during the chemical operations is correspondingly reduced.

In microfluidic systems, regulation of minute fluid flows through a microchannel is of prime importance, as the processes performed in these systems highly depend on the delivery and movement of various liquids such as sample and reagents. A flow control device may be used to regulate, allow or halt the flow of liquid through a microchannel, either manually or automatically. Regulation includes control of flow rate, impeding of flow, switching of flows between various input channels and output channels, as well as volumetric dosing. It is generally desirable that flow control devices, such as valves, precisely and accurately regulates fluid flow, while being economical to manufacture.

SUMMARY OF THE INVENTION

The present invention provides a latching micro-regulator for regulating liquid flow on micro-scale levels. The latching micro-regulator provides binary addressable flow control using digital latching. The latching micro-regulator includes a bi-stable latching valve comprising a substrate having an inlet port and an outlet port, a valve seat defining a valve chamber for opening and closing the inlet port, and an actuator assembly for actuating the valve element. The valve chamber is configured to contain a volume of fluid, and the inlet port and the outlet port are in fluid communication with the valve chamber to provide a liquid flow path through the chamber. The actuator assembly comprises a cantilever beam for moving the valve seat between an open position and a closed position, an actuator, such as a piezoelectric element, for moving the cantilever beam, and a latch, such as a permanent magnet, for securing the cantilever beam in the closed position.

According to a first aspect of the invention, a bi-stable latching valve for controlling fluid flow through a channel is provided. The bi-stable latching valve comprises a substrate defining an inlet port and an outlet port in communication with the channel, a valve seat, an actuator assembly for selectively moving the valve seat between the open position and the closed position and a latching mechanism. The valve seat defines a valve chamber in communication with the inlet port and the outlet port for containing a volume of fluid and the valve seat moves between a closed position wherein the valve seat blocks one of said inlet port and said outlet port and an open position to allow fluid flow through the valve chamber to regulate fluid flow through the chamber. The latching mechanism latches the valve seat in one of said open position and closed position.

According to another aspect, a flow regulating system is provided. The flow regulating system comprises a first flow channel for conveying liquids having a first flow resistance, a first bi-stable valve in communication with the first flow channel for selectively blocking liquid flow through the first flow channel, a second flow channel for conveying liquids having a second flow resistance and a second bi-stable valve in communication with the second flow channel for selectively blocking liquid flow through the second flow channel.

According to yet another aspect, a flow regulating system is provided. The flow regulating system comprises a first flow channel for conveying liquids having a first flow resistance, a first bi-stable latching valve in communication with the first flow channel for selectively blocking liquid flow through the first flow channel, a second flow channel for conveying liquids having a second flow resistance and a second bi-stable latching valve in communication with the second flow channel for selectively blocking liquid flow through the second flow channel. The first and second bi-stable latching valve each comprise a piezoelectric actuator for selectively opening and blocking the flow channel, and a magnetic latch for locking the valve in a closed position.

BRIEF DESCRIPTION OF THE FIGURES

FIG. 2b is a top view of the bi-stable latching valve of FIG. 2a.

DETAILED DESCRIPTION OF THE INVENTION

The present invention provides a digital latching microregulator including a bi-stable latching valve for accurately controlling fluid flow on demand. The present invention will be described below relative to an illustrative embodiment. Those skilled in the art will appreciate that the present invention may be implemented in a number of different applications and embodiments and is not specifically limited in its application to the particular embodiments depicted herein.

Figure 1:
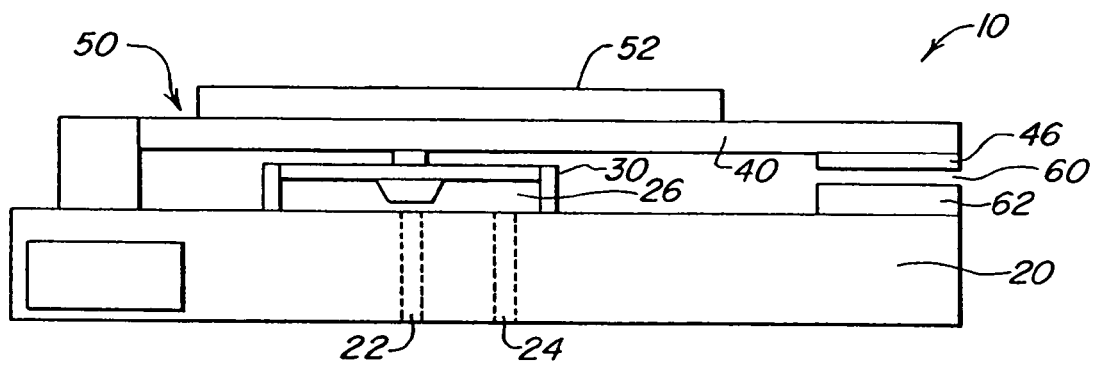
FIG. 1 is a cross-sectional side view of an embodiment of the bi-stable latching valve of the present invention.

The present invention provides a bi-stable latching valve for selectively blocking fluid flow through a channel. The valve is positioned in a channel to selectively block liquid flow through the channel. As shown in FIG. 1, the bi-stable latching valve 10 of the present invention comprises a substrate 20 having an inlet port 22 and an outlet port 24 formed therein in fluid communication with a channel through which liquid flows. The substrate 20 is preferably formed of glass or plastic, though other materials may be used. The bi-stable latching valve 10 further includes a valve seat 30 cooperating with the substrate to define a valve chamber 26 in communication with the inlet port 22 and the outlet port 24 for containing a volume of fluid. The valve seat 30 selectively blocks the inlet port 22 to regulate the flow of fluid into the chamber 26. The position of the valve seat 30 controls the fluid flow into the chamber 26. The position of the valve seat 30 is controlled by an actuator assembly 50. The actuator assembly can comprise any suitable structure for selectively operating or moving the valve seat 30 to block the inlet port 22 or the outlet port 24. According to one embodiment, the actuator assembly includes a cantilever beam 40 hinged to the substrate 20, an actuator 52, and a latching mechanism 60.

The position of the valve seat 30 is determined by the position of the cantilever beam 40. The valve seat 30 is connected to the cantilever beam 40, which is in turn connected to the actuator 52. The actuator 52 can comprise any suitable structure for moving the valve seat 30 between an open position for allowing fluid to enter or exit the chamber, and a closed position. Examples of suitable actuators include mechanical, electrical, electromechanical, and magnetic devices. According to a preferred embodiment, the actuator 52 is a piezoelectric element. The cantilever beam 40 is hinged at a first end 41 to the glass substrate 20 and rotates about the fixed hinge under the control of the actuator 52 to move the valve seat 30 between the open and closed positions. When the cantilever beam 40 is lowered, the beam pushes the valve seat 30 into a closed position, thereby blocking the inlet port and preventing fluid flow into the chamber. When the cantilever beam 40 is raised, the valve 30 is moved to an open position to allow fluid flow through the chamber 26. The cantilever beam 40 is driven by the piezoelectric element 52, which selectively applies a driving force to the beam 40.

The bi-stable latching valve 10 further includes a latching mechanism 60 for selectively latching or holding the beam 40 in a selected position. The latching mechanism can include any suitable mechanical, electrical, electromechanical or magnetic structure suitable for latching the beam 40. The latching mechanism 60, according to a preferred embodiment, comprises a permanent magnet 62 and a permalloy element 46 disposed on a free end 44 of the beam 40. The permanent magnet 62 is attached to the glass substrate 20 opposite the permalloy element 46 and is configured to attract the permalloy element 46. The magnetic attraction between the permanent magnet and the permalloy element is effective to latch, i.e. to retain, the valve element in a closed position to prevent fluid flow through the bi-stable latching valve 10.

Figure 2A:
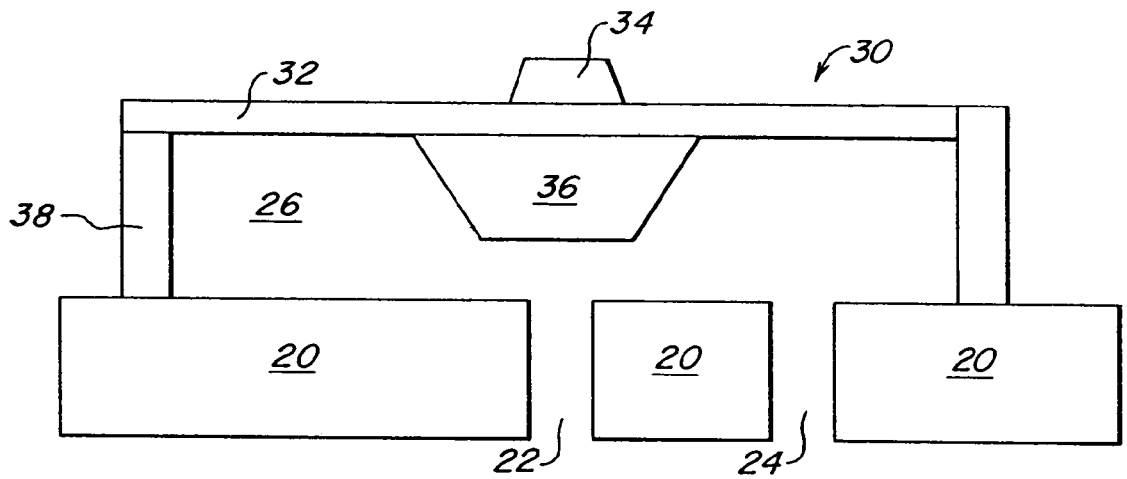
FIG. 2a is a detailed side view of the bi-stable latching valve of FIG. 1 in an open position.
Figure 2B:
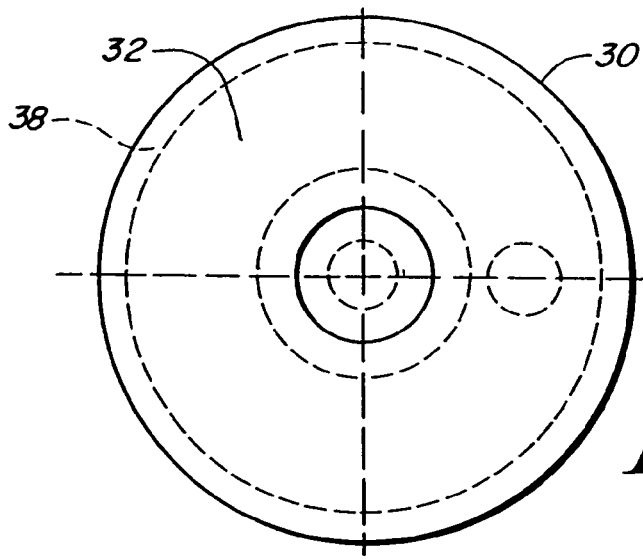

As shown in FIGS. 2a and 2b, the valve seat 30 is cylindrical in shape and includes a rim 38 about the circumference of the valve seat 30, which defines the valve chamber 26. The rim 38 cooperates with the glass substrate 20 to fluidly seal the valve chamber 26. The valve chamber communicates with the inlet port 22 and the outlet port 24. The valve seat 30 is preferably formed of a flexible material, such as silicone rubber, though one skilled the art will recognize that alternate materials may be used. The valve seat 30 further comprises a membrane portion 32, a first protrusion 34 for contacting the cantilever beam 40 and second protrusion 36 for selectively blocking the inlet port 22 to prevent the flow of fluid through the valve chamber 26, thereby blocking fluid flow through the associated channel. The second protrusion blocks the inlet port 22 when the cantilever beam depresses the valve seat 30 by pushing on the first protrusion 34. One skilled in the art will recognize that the valve seat 30 is not limited to a cylindrical shape, and that any suitable shape may be utilized.

The operation of the bi-stable latching valve 10 is illustrated in FIGS. 3a–3b and FIGS. 4a–4b. The bi-stable latching valve 10 switches between two stable states: an ON state, which allows the flow of liquid through the valve chamber and an OFF state, which prevents the flow of liquid through the valve chamber. The state of the bi-stable latching valve 10 is controlled by the driving force on the cantilever beam 40 by the actuator 52 and the magnetic latching force created by the permanent magnet 62 on the beam free end. According to the illustrative embodiment, the bi-stable latching valve only requires power to switch between the two stable states and does not otherwise require power to operate.

Figure 3A:
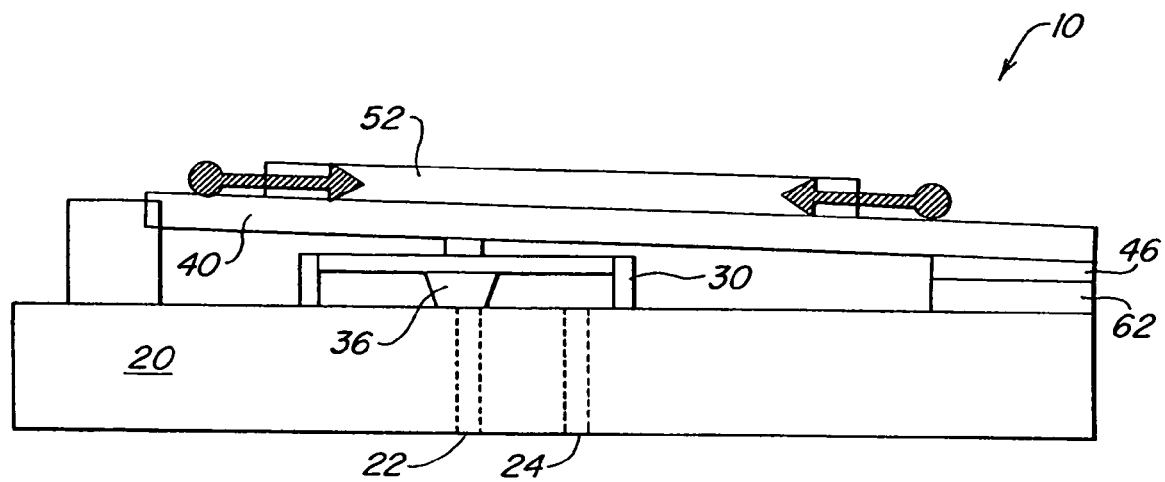
FIGS. 3a and 3b illustrate the bi-stable latching valve switching from a closed position to an open position.

FIG. 3*a* illustrates the bi-stable latching valve 10 in an OFF state, where the second protrusion 36 of the valve seat 30 blocks the inlet port 22 so that fluid is prevented from flowing through the valve chamber 26. In the OFF state, the latching mechanism 60 latches the cantilever beam 40 in the closed position by securing the permalloy element 46 to the permanent magnet 60. As shown, when the attractive force of the magnet pulls the cantilever beam towards the magnet, causing the cantilever beam to push the valve into the closed position, such that the first protrusion blocks the inlet port. The valve maintains the closed position until activated.

Figure 3B:
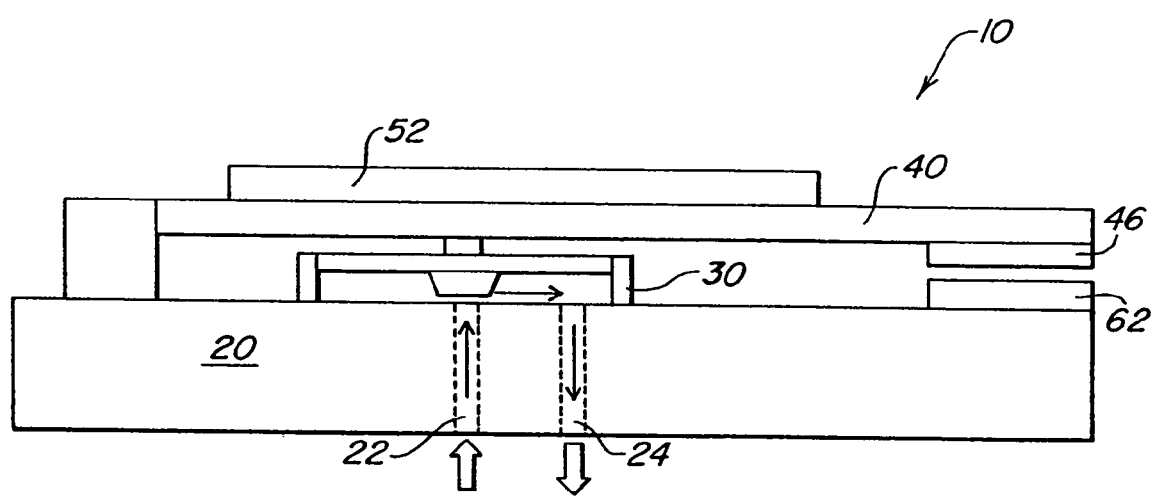

To open the bi-stable latching valve and allow fluid flow, a voltage is applied to the piezoelectric element 52 using a controller (not shown). The applied voltage causes the piezoelectric element to compress, applying an opposite force on the cantilever beam in the direction away from the magnet. If the force generated is sufficient to overcome the magnetic attraction between the magnet and the permalloy, the magnet releases the permalloy element and the cantilever beam raises, pulling the valve seat 30 clear of the inlet port 22. As shown in FIG. 3*b*, fluid flows through unobstructed inlet port 22 into the valve chamber and out of the valve chamber via the outlet port.

Figure 4A:
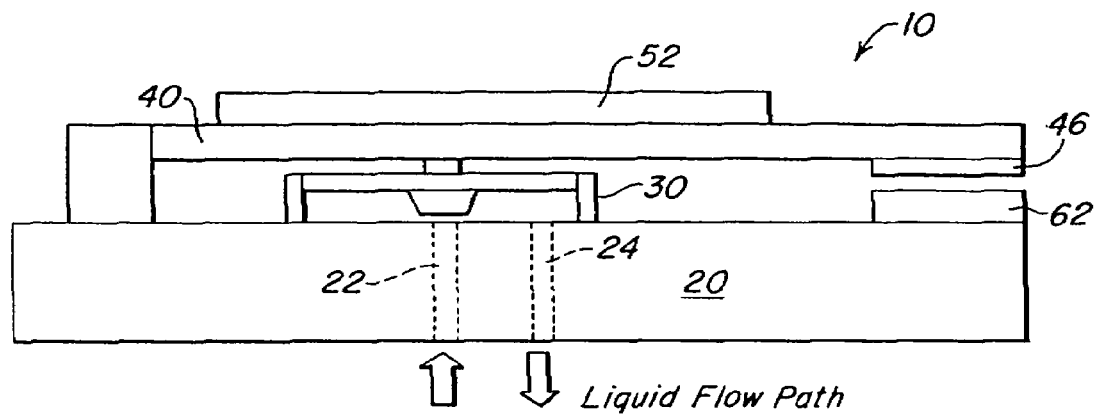
FIGS. 4a and 4b illustrate the bi-stable latching valve switching from an open position to a closed position.
Figure 4B:
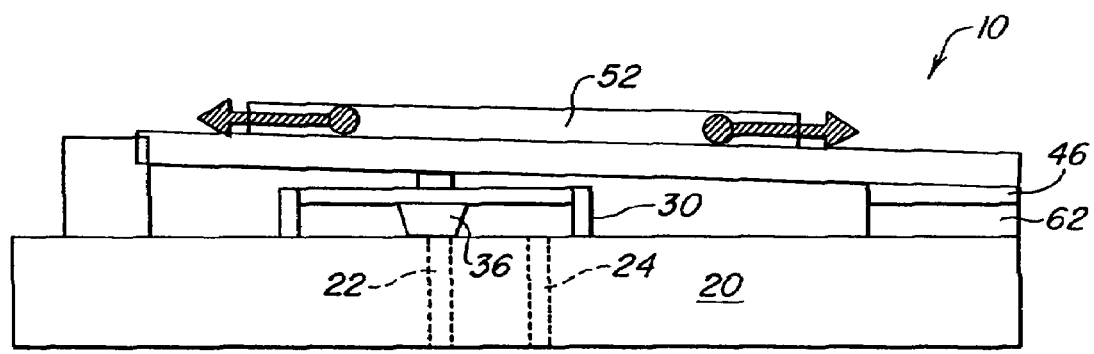

The bi-stable latching valve 10 remains in the ON state, as shown in FIG. 4*a*, until the controller subsequently actuates the piezoelectric element 52 by applying a second voltage. The second voltage causes the piezoelectric element to expand, which applies a driving force on the cantilever beam 40, pushing the beam towards the magnet 60. The lowered beam in turn applies a force to the valve seat 30, which shifts into a closed position, blocking the inlet port. When the permalloy element 46 is brought close to the magnet 62, a magnetic latching force generated by the magnet latches the beam 40 into the closed position until a subsequent actuation of the piezoelectric element 52.

Figure 5:
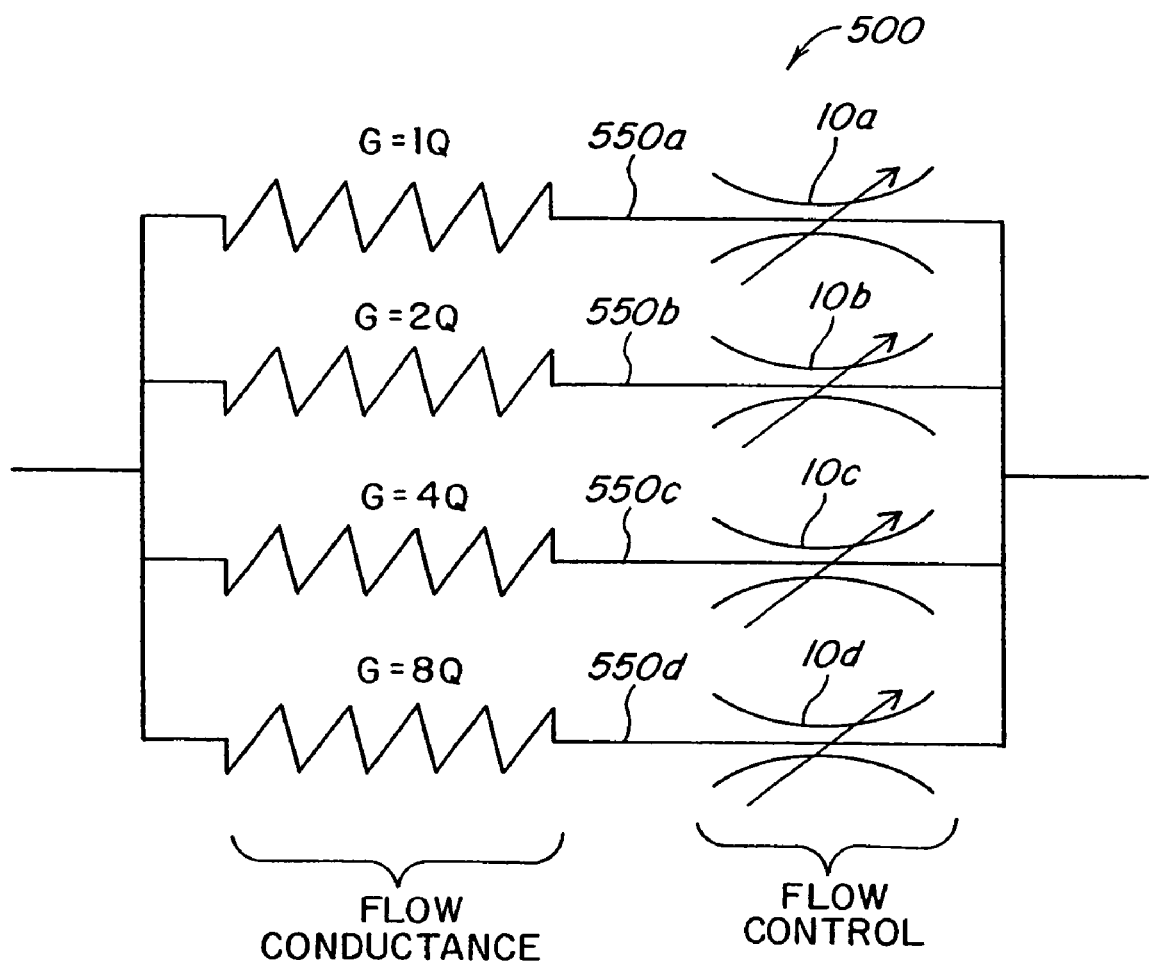
FIG. 5 is a schematic diagram of a flow regulating system for a microfluidic system implementing a plurality of bi-stable latching valves according to an illustrative embodiment of the invention to provide variable control of fluid flow.

The bi-stable latching valve 10 may be employed in a valve architecture to provide binary addressable flow control using digital latching. As shown in FIG. 5, multiple bi-stable latching valves may be connected to channels 550 of specific flow conductance that vary according to a pre-determined ratio to provide a micro-regulator 500. Each bi-stable latching valve 10 can be set to an on or off state as described previously, allowing or blocking flow through its associated flow channel 550. The bi-stable latching valves are selectively activated in various combinations to provide a number of discrete flow conductance states through the micro-regulator 500. The net flow through the micro-regulator is therefore determined by the sum of the flows through the open bi-stable latching valves 10. The number of discrete flow conductance states is determined by the number of bi-stable latching valves in the system and the flow conductance ratios between the channels.

A typical example of a 4-bit micro-regulator system is illustrated in FIG. 5. The individual channels 550*a*, 550*b*, 550*c* and 550*d* in the system have flow conductance ratios of 1:2:4:8, thus providing 16 discrete net flow conductance states. For example, a first flow conductance state may be provided by opening all of the bi-stable latching valves 10*a*–10*d* to allow flow through all of the channels 550*a*, 550*b*, 550*c* and 550*d*. A second flow conductance state is achieved by closing the first bi-stable latching valve 10*a*, while leaving the remaining bi-stable latching valves 10*b*, 10*c*, 10*d* open, allowing fluid flow through the channels 550*b*, 550*c* and 550*d* only. A third conductance state is achieved by closing the first and second bi-stable latching valves 10*a*, 10*b* while leaving the remaining bi-stable latching valves 10*c*, 10*d* to allow flow through the associated channels 550*c* and 550*d*, and so on. This allows flow rates to be controlled to a 6.67% precision. Higher precision can be obtained by increasing the number of bits in the system— for example an 8-bit system has 128 discrete states, achieving less than 1% precision in the flow rate control.

One skilled in the art will recognize that any suitable bi-stable valve for selectively blocking liquid flow through a channel may be used in the flow regulating system 500 of FIG. 5 to provide variable flow resistance. The micro-regulator 500 may have any suitable number of channels arranged in any suitable configuration and having any suitable flow resistance to achieve a system having variable flow resistance, wherein the flow resistance depends on the state of the bi-stable valves.

The manufacturing process for the bi-stable latching valve 10 of an illustrative embodiment of the present invention is efficient, economical and simplified. The valve seat 30 may be formed by surface micromachining of a substrate, followed by deposition of silicone rubber, the permalloy element 46 and polysilicon. The substrate 20 is etched to form a channel and then drilled to form the inlet port 22 and the outlet port 24. The cantilever beam 40 may be attached and hinged to the glass substrate through means known in the art. The permalloy element may be bonded to the beam and the permanent magnet 62 may be bonded to the substrate through means known in the art. The piezoelectric element 52 or other actuator for driving the cantilever beam 40 may be attached to the beam through any suitable means.

The present invention has been described relative to an illustrative embodiment. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

The invention claimed is:

1. A bi-stable latching valve for controlling fluid flow through a channel, comprising:
   a substrate defining an inlet port and an outlet port in communication with the channel;
   a valve seat stacked on the substrate and comprising a flexible membrane portion having a rim that sealingly contacts the substrate to define a valve chamber in communication with the inlet port and the outlet port for containing a volume of fluid, wherein the valve seat moves between a closed position wherein the valve seat blocks one of said inlet port and said outlet port and an open position to allow fluid flow through the valve chamber to regulate fluid flow through the chamber;
   an actuator assembly for selectively moving the valve seat between the open position and the closed position, the actuator assembly including a cantilever beam hinged to the substrate and connected to the valve seat for moving the valve seat between the open position and the closed position; and a latching mechanism for latching the valve seat in one of said open position and closed position.

2. The bi-stable latching valve of claim 1, wherein the latching mechanism comprises a magnet.

3. The bi-stable latching valve of claim 1, wherein the latching valve latches the valve seat in the closed position.

4. The bi-stable latching valve of claim 1, wherein the actuator is a piezoelectric element.

5. The bi-stable latching valve of claim 1, wherein the actuator comprises a piezoelectric element attached to the cantilever beam for moving the cantilever beam.

6. The bi-stable latching valve of claim 5, further comprising a controller for actuating the piezoelectric element.

7. The bi-stable latching valve of claim 1, wherein the valve seat includes a first protrusion extending into the valve chamber for selectively blocking one of said inlet port and said outlet port.

8. The bi-stable latching valve of claim 7, wherein the valve seat includes a second protrusion external to the valve chamber for contacting the cantilever beam hinged to the substrate, wherein the cantilever beam pushes on the second protrusion to move the valve seat to a closed position.

9. A bi-stable latching valve for controlling fluid flow through a channel, comprising:
a substrate defining an inlet port and an outlet port in communication with the channel;
a valve seat defining a valve chamber in communication with the inlet port and the outlet port for containing a volume of fluid, wherein the valve seat includes a first protrusion extending into the valve chamber and a second protrusion external to the valve chamber for contacting a cantilever beam hinged to the substrate, and the valve seat moves between a closed position, where the first protrusion blocks one of said inlet port and said outlet port, and an open position to allow fluid flow through the valve chamber to regulate fluid flow through the chamber, wherein the cantilever beam pushes on the second protrusion to move the valve seat to the closed position;
an actuator assembly for selectively moving the valve seat between the open position and the closed position; and
a latching mechanism for latching the valve seat in one of said open position and said closed position.

10. The bi-stable latching valve of claim 9, wherein the actuator comprises a piezoelectric element attached to the cantilever beam for moving the cantilever beam.

11. The bi-stable latching valve of claim 10, further comprising a controller for actuating the piezoelectric element.

12. The bi-stable latching valve of claim 9, wherein the latching mechanism comprises a magnet.

13. The bi-stable latching valve of claim 9, wherein the latching valve latches the valve seat in the closed position.

14. The bi-stable latching valve of claim 9, wherein the actuator is a piezoelectric element.

15. The bi-stable latching valve of claim 9, wherein the valve seat comprises a flexible membrane portion having a rim that sealing contacts the substrate to define the valve chamber, and the first protrusion is mounted on an interior surface of the flexible membrane portion.

16. A bi-stable latching valve for controlling fluid flow through a channel, comprising:
a substrate defining an inlet port and an outlet port in communication with the channel;
a valve seat defining a valve chamber in communication with the inlet port and the outlet port for containing a volume of fluid, wherein the valve seat moves between a closed position wherein the valve seat blocks one of said inlet port and said outlet port and an open position to allow fluid flow through the valve chamber to regulate fluid flow through the chamber;
a first protrusion mounted externally to the valve chamber opposite a second protrusion extending into the valve chamber;
a cantilever beam hinged to the substrate, the cantilever beam selectively contacting the first protrusion under the control of an actuator to move the valve seat between the open position and the closed position; and
a latching mechanism for latching the valve seat in one of said open position and closed position.

17. The bi-stable latching valve of claim 16, wherein the second protrusion extends into the interior of the valve chamber and selectively blocks said one of said inlet port and said outlet port when the cantilever beam moves the valve seat to the closed position.

18. The bi-stable latching valve of claim 17, wherein the valve seat comprises a flexible membrane portion having a rim that sealing contacts the substrate to define the valve chamber, and the first protrusion and the second protrusions are mounted on opposite sides of the flexible membrane portion.

* * * * *